United States Patent [19]

Shimizu et al.

[11] Patent Number: 5,442,017
[45] Date of Patent: Aug. 15, 1995

[54] PROCESS FOR PRODUCING POLYMER WHEREIN POLYMER SCALE DEPOSITION IS PREVENTED

[75] Inventors: Toshihide Shimizu, Urayasu; Mikio Watanabe, Kamisu, both of Japan

[73] Assignee: Shin-Etsu Chemical Co., Ltd., Tokyo, Japan

[21] Appl. No.: 220,035

[22] Filed: Mar. 30, 1994

Related U.S. Application Data

[63] Continuation-in-part of Ser. No. 950,128, Sep. 24, 1992, abandoned.

[30] Foreign Application Priority Data

Sep. 24, 1991 [JP] Japan ................................. 3-271944
Sep. 24, 1991 [JP] Japan ................................. 3-271945

[51] Int. Cl.$^6$ ............................................. C08F 14/06
[52] U.S. Cl. ........................................ 526/62; 526/341; 526/343; 526/344; 526/347.2
[58] Field of Search ................. 526/62, 341, 343, 344, 526/347.2

[56] References Cited

U.S. PATENT DOCUMENTS 5,053,466 10/1991 Shimizu et al. ........................ 526/62
5,264,505 11/1993 Shimizu et al. ........................ 526/62

*Primary Examiner*—Joseph L. Schofer
*Assistant Examiner*—Tom Weber
*Attorney, Agent, or Firm*—Oblon, Spivak, McClelland, Maier, & Neustadt

[57] ABSTRACT

A monomer having an ethylenic double bond is polymerized in a polymerization vessel provided on its inner wall surfaces with a coating of a polymer scale preventive agent which comprises a condensation product of an aromatic amine compound with an aromatic hydroxyl compound condensate. This process makes it possible to prevent effectively the deposition of polymer scale and to produce a polymer which shows few fish eyes and good whiteness when formed into sheets or the like.

12 Claims, No Drawings

PROCESS FOR PRODUCING POLYMER WHEREIN POLYMER SCALE DEPOSITION IS PREVENTED

This is a continuation-in-part application of Application Ser. No. 07/950,128 filed on Sep. 24, 1992, now abandoned.

BACKGROUND OF THE INVENTION

1. Field of the Invention

The present invention relates to a process of producing a polymer by polymerizing a monomer having an ethylenic double bond, and more particularly to a process of producing the polymer while effectively preventing polymer scale from being deposited on the inner wall surfaces, etc. of a polymerization vessel.

2. Description of the Prior Art

As a method of polymerizing a monomer having an ethylenic double bond, are known suspension polymerization, emulsion polymerization, solution polymerization, gas phase polymerization and bulk polymerization. In any type of the polymerizations, polymer scale is liable to be deposited on the areas with which the monomer come into contact during polymerization, such as inner walls, stirring equipment and so on of a polymerization vessel.

The deposition of the polymer scale results in disadvantages that the yield of the polymer and cooling capacity of the polymerization vessel are lowered; that the polymer scale may peel and mix into a polymeric product, thereby impairing the quality thereof; and that removal of such polymer scale is laborious and hence time-consuming. Further, the polymer scale contains unreacted monomers and operators may be exposed thereto, which may cause physical disorders in the operators.

Heretofore, as a method for preventing polymer scale deposition on the inner wall and so forth, methods by which a polymer scale preventive agents comprising an amine compound, quinone compound, aldehyde compound or the like is coated on the inner wall, etc. of a polymerization vessel or methods by which such compounds are added to an aqueous medium for polymerization have been known (Japanese Patent Publication (KOKOKU) No. 45-30343 (1970)).

These methods can prevent the deposition of polymer scale if polymerization run is repeated within about 5 or 6 times; however, if the number of repetition of polymerization run exceeds 5 or 6, the scale preventive effect is weakened. That is, the scale preventive effect is poor in durability. Particularly, the scale preventive effect is adversely affected where a water-soluble catalyst is used and unsatisfactory industrially.

It is proposed in Japanese Pre-examination Patent Publication (KOKAI) No. 57-155201 (1982) to form a coating of a condensation product of an aromatic amine compound on the areas with which monomers comes into contact, such as the inner wall of a polymerization vessel. The formation of the coating of such a condensation product enables repetition of about 100 to 200 polymerization runs without deposition of polymer scale on the areas in the liquid phase, i.e., under the liquid surface inside the polymerization vessel. This effect is not lost even where a water-soluble catalyst is used, However, polymer scale deposition is liable to occur on areas around the interface between the gas phase and the liquid phase which is located at the upper section of a polymerization vessel. Once polymer scale is deposited on an area around the interface between the gas phase and the liquid phase, the deposited scale will grow gradually as polymerization runs are repeated, and at last it is peeled from the inner wall, etc. and incorporated into the polymeric product. If the polymeric product containing the polymer scale is processed into formed products such as sheets or the like, the polymers scale causes increase in fish eyes in the formed products, lowering seriously the quality thereof.

Polymeric products obtained by polymerization are required to have a high whiteness. That is, when a polymeric product is formed into a sheet or the like without any addition of a coloring agent, the resulting formed product is more or less colored and such coloration, called initial coloration, is desired to be as low as possible. However, the coating comprising said condensation product of an aromatic amine compound disclosed in the Japanese Pre-examination Publication may be peeled or dissolved into a polymeric product, thereby lowering the whiteness or increasing the initial coloration thereof.

SUMMARY OF THE INVENTION

It is accordingly an object of the present invention to provide a process of producing a polymer by polymerization of a monomer having an ethylenic double bond that can prevent effectively the deposition of polymer scale not only on the areas located in the liquid phase but also on the areas around the interface between the gas and liquid phases, and can produce polymeric products with a very small number of fish eyes and low initial coloration after processed into formed products such as sheets or the like.

Thus, the present invention provides a process of producing a polymer of a monomer having an ethylenic double bond, which comprises polymerizing the monomer in a polymerization vessel having a coating on its inner wall surfaces, wherein said coating comprises:
(A) at least one condensation product selected from the group consisting of:
  condensation products of an aromatic amine compound selected from the group consisting of the compounds having the following general formulas (1) to (3):

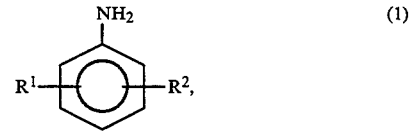

(1)

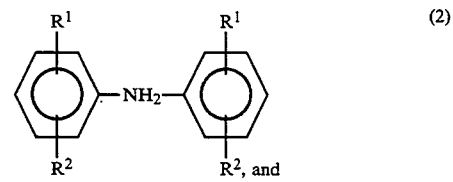

(2)

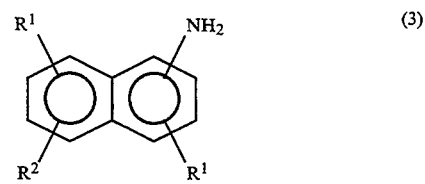

(3)

wherein in the formulas (1) to (3) $R^1$ is —H, —$NH_2$, —Cl, —OH, —$NO_2$, —$COCH_3$, —$OCH_3$, —$N(CH_3)_2$ or an alkyl group of 1 to 3 carbon atoms, and $R^2$ is —H, —$NH_2$, —OH, —$CH_3$, —COOH or —$SO_3H$, with an aromatic hydroxyl compound-acetone condensate (I), condensation products of an aromatic amine compound having the above general formula (3) with an aromatic hydroxyl compound-aldehyde condensate (II), condensation products of an aromatic amine compound having the above general formula (3) with a condensate (III) of an aromatic hydroxyl compound alone, condensation products of an aromatic amine compound having the above general formula (3) with an aromatic hydroxyl compound-aromatic amine compound condensate (IV), and condensation products of an aromatic amine compound having the above general formula (3) with a natural aromatic hydroxyl-containing organic compound (V);

(B) a water-soluble polymeric compound; and (C) a colloidal silica and/or an alkali metal silicate.

According to the present invention, deposition of polymer scale can be effectively prevented not only on the areas in the liquid phase but also on the areas around the interface between the gas and liquid phases in a polymerization vessel.

Therefore, the present invention makes it unnecessary to conduct the operation of removing the polymer scale after every polymerization run, and the productivity is thereby improved.

Further, when the polymeric product obtained by the application of the present invention is processed into formed products such as sheets, the resulting formed products have very few fish eyes and high whiteness or low initial coloration. That is, the formed products exhibit a luminosity index L in the Hunter's color difference equation described in JIS Z 8730(1980) of 70 or more.

DETAILED DESCRIPTION OF PREFERRED EMBODIMENTS

(A) Condensation Product

In the present invention, the condensation product of component (A) for formation of a coating is derived from an aromatic amine compound which is represented by one of the above general formulas (1) to (3). In the above formulas (2) and (3), the two $R^1$ groups or $R^2$ groups may be the same or different from each other.

Specifically, the aromatic amine compounds of the general formulas (1) to (3) include, for example, the following compounds.

Aromatic amine compounds of the general formula (1):

aniline, o-, m- or p-phenylenediamine, o-, m- or paminophenol, o-, m- or p-chloroaniline, o-, m- or p-nitroaniline, o-, m- or p-methylaniline, N,N-dimethylparaphenylenediamine, 4-chloro-o-phenylenediamine, 4-methoxy-o-phenylenediamine, 2-amino-4-chlorophenol, 2,3-diaminotoluene, 5-nitro-2-aminophenol, 2-nitro-4aminophenol, 4-nitro-2-aminophenol, o-, m- or p-aminosalicylic acid, o-, m- or p-aminobenzoic acid, 2,4- or 3,5- diaminobenzoic acid, o-, m- or p-aminobenzenesulfonic acid, 2,4-diaminobenzenesulfonic acid and the like. Among these compounds, preferred are o-,m- or p-aminophenol, aniline, 4-methoxy-o-phenylenediamine, 5-nitro-2aminophenol, 2-nitro-4-aminophenol, o-, m- or p-aminosalicylic acid, p-aminobenzenesulfonic acid and 2,4diaminobenzenesulfonic acid.

Aromatic amine compounds of the general formula (2):

4-aminodiphenylamine, 2-aminodiphenylamine, 4,4-diaminodiphenylamine, 4-amino-3'-methoxydiphenylamine, 4-amino-4'-hydroxydiphenylamine and the like. Among the compounds, preferred are 4-aminodiphenylamine, 2-aminodiphenylamine and 4,4'-diaminodiphenylamine.

Aromatic amine compounds of the general formula (3):

α-naphthylamine, β-naphthylamine, 1,5-diaminonaphthalene, 1-amino-5-hydroxynaphthalene, 1,8-diaminonaphthalene, 2,3-diaminonaphthalene and the like. Among these compounds, preferred are α-naphthylamine, 1,5-diaminonaphthalene and 1,8-diaminonaphthalene.

Each of the above aromatic amine compounds forms a condensation product of component (A) upon being condensed with one of aromatic hydroxyl compound condensates (I) to (V), which will be described in detail below.

(I) Aromatic hydroxyl compound-acetone condensate:

This condensate (I) is capable of condensation with any one of the aromatic amine compounds of the general formulas (1) to (3), to form a condensation product which serves as component (A). The aromatic hydroxyl compound as an essential condensing component of the condensate (I) includes, for example, the compounds having the following formula (4) or (5).

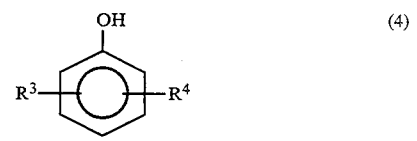

wherein $R^3$ stands for —H, —Cl, —OH, —$COCH_3$, —$OCH_3$, —COOH, —$SO_3H$ or an alkyl group having 1 to 3 carbon atoms, and $R^4$ stands for —H, —Cl, —OH, —$OCH_3$, —$OC_2H_5$ or —COOH.

Specifically, the compounds of the general formula (4) include, for example, phenols such as phenol, hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 2,5-, 2,6- or 3,5-dihydroxytoluene and the like.

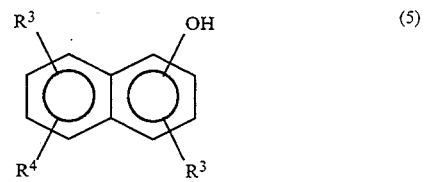

wherein the two $R^3$ may be the same or different and are each as defined above, and $R^4$ is as defined above.

Specifically, the compounds of the general formula (5) include, for example, naphthols and their derivatives such as α-naphthol, β-naphthol, 1,3-, 1,4-, 1,5-, 2,3-, 2,6- or 2,7-dihydroxynaphthalene, 1-hydroxy-2-naphthoic acid, 3-hydroxy-2-naphthoic acid and the like.

Typical examples of the condensate (I) of the above aromatic hydroxyl compound with acetone include pyrogallolacetone condensates, resorcinol-acetone condensates, 2,7-dihydroxynaphthalene-acetone condensates, 1,5-dihydroxynaphthalene-acetone condensates, 2,6-dihydroxynaphthalene-acetone condensates, 2,3-dihydorxynaphthalene-acetone condensates, 2-hydroxynaphthoquinone-acetone condensates, alizarin-acetone condensates and the like. The condensates (I) above can be obtained by dissolving an aromatic hydroxyl compound in acetone, and reacting them in the presence of a catalyst at a temperature of about room temperature to 100° C. As the catalyst, phosphorus oxychloride is used, for instance.

(II) Aromatic hydroxyl compound-aldehyde condensate:

This condensate (II) is capable of condensation with an aromatic amine compound of the above general formula (3) to form a condensation product which serves as the component (A).

The aromatic hydroxyl compound used as one of the reactants in forming the condensate (II) includes, for example, the compounds of the above formula (4) and the compounds of the above formula (5), as in the case of the condensate (I). On the other hand, the aldehyde used as the other reactant includes, for example, formaldehyde, acetaldehyde, glyoxal, glutaraldehyde, benzaldehyde and the like.

Typical examples of the condensate (II) include the condensates of formaldehyde with phenol, hydroquinone, catechol, pyrogallol, 2,7-dihydroxynaphthalene, 1,5-dihydroxynaphthalene, 2,3-dihydroxynaphthalene, alizarin, anthraflavic acid, or 1,4,5,8-tetrahydroxynaphthalene, pyrogallol-benzaldehyde condensates, phenol-benzaldehyde condensates, 2,3-dihydroxynaphthalene-benzaldehyde condensates, catechol-benzaldehyde condensates, anthraflavic acid-benzaldehyde condensates, 2,7-dihydroxynaphthalene-benzaldehyde condensates, 1,4,5,8-tetrahydroxynaphthalene-benzaldehyde condensates, 1,5-dihydroxynaphthalene-benzaldehyde condensates, 1,5-dihydoroxynaphthlene benzaldehyde condensates and the like.

The condensates (II) can be obtained by reacting an aromatic hydroxyl compound and an aldehyde in the presence of a catalyst in an aqueous or alcoholic solvent around room temperature to about 200° C. The catalyst includes, for example, acidic substances such as phosphoric acid and hydrochloric acid, and alkaline substances such as sodium hydroxide, potassium hydroxide and ammonia.

(III) Condensate of aromatic hydroxyl compound alone:

This condensate (III) is capable of condensation with an aromatic amine compound of the above general formula (3) to form a condensation product which serves as the component (A).

The condensate (III) can be obtained by condensing solely an aromatic hydroxyl compound of the above formula (4) or (5). Typical examples of the condensate (III) include the condensates of pyrogallol, resorcinol, catechol, 2,7-dihydroxynaphthalene, or 2-hydroxynaphthoquinone.

The condensates (III) can be obtained by reacting an aromatic hydroxyl compound in the presence of a catalyst such as a peroxide, azo compound, nitro compound, halogen compound, quinone or metallic salt at a temperature of about room temperature to 100° C. in water, an organic solvent such as alcohols, ketones, and esters, or a mixed solvent of water and an organic solvent mentioned above. Specifically, the catalyst used includes, for example, peroxides such as periodic acid, potassium periodate and hydrogen peroxide, azo compounds such as $\alpha,\alpha'$-azobisisobutyronitrile, metallic salts such as ferric chloride, aromatic nitro compounds such as nitrobenzene, and aromatic quinone compounds such as p-benzoquinone.

(IV) Aromatic hydroxyl compounds aromatic amine compound condensate:

This condensate (IV) is capable of condensation with an aromatic amine compound of the above general formula (3) to form a condensation product which serves as the component (A).

The aromatic hydroxyl compound used as one of the reactants in forming the condensate (IV) includes, for example, the compounds which have the above formula (4) or (5). As the other reactant, or the aromatic amine compound, any one of the compounds of the above general formulas (1) to (3) can be used.

The combination of an aromatic hydroxyl compound and an aromatic amine compound is not particularly limited. Typical examples include pyrogallol-p-phenylenediamine condensates, resorcinol-m-phenylene condensates, pyrogallol-1,8-diaminonaphthalene condensates, catechol-1,8-diaminonaphthalene condensates, 2,7-dihydroxynaphthalene-p-aminophenol condensates, 4-aminodiphenylamine-pyrogallol condensates, and 2,3-dihydroxynaphthalene-1,5-diaminonaphthalene condensates.

The condensate (IV) can be obtained by reacting an aromatic hydroxyl compound and an aromatic amine compound at a temperature of about room temperature to about 200° C. in the presence of a catalyst in water, an organic solvent such as alcohols, ketones and esters, or a mixed solvent of water and an organic solvent mentioned above. The catalyst used includes, for example, peroxides such as periodic acid, potassium periodate and hydrogen peroxide, azo compounds such as $\alpha,\alpha'$-azobisisobutyronitrile, metallic salts such as ferric chloride, aromatic nitro compounds such as nitrobenzene, and aromatic quinone compounds such as p-benzoquinone.

(V) Natural aromatic hydroxyl-containing organic compound:

This organic compound (V) is capable of condensation with an aromatic amine compound of the above general formula (3) to form a condensation product which serves as the component (A).

The natural aromatic hydroxyl-containing organic compounds (V) include, for example, Chinese gallotannin, sumac tannin, tara tannin, valonia tannin, chestnut tannin, myrobalan tannin, oak tannin, divi-divi tannin, algarobillatannin, gambier tannin, quebrachotannin, wattle tannin, mimosa tannin, mangrove tannin, hemlock tannin, spruce tannin, Burma cutch tannin, oak bark tannin, tannin of persimmon, curcumin, urushiol, lignin, sodium lignin sulfonate, alkali lignin and the like.

Among the aromatic hydroxyl compound condensates (I) to (V) above, preferred are pyrogallol-acetone condensates, 2,7-dihydroxynaphthalene-acetone condensates, 2,3-dihydroxynaphthalene-acetone condensates, resorcinolacetone condensates, 2,7-dihydroxynaphthalene-benzaldehyde condensates, 2,3-dihydroxynaphthalene-formaldehyde condensates, 1,4,5,8-tetrahydroxynaphthalene-benzaldehyde condensates, pyrogallol-formaldehyde condensates, 2,7dihydroxynaphthalene condensates, pyrogallol condensates, 2,7-dihydroxynaphthalene-p-aminophenol condensates, catechol-4-aminodiphenylamine condensates, pyrogallol-1,8diaminonaphthalene condensates, Chinese gallotannin, wattle tannin, mimosa tannin, oak tannin, hemlock tannin, quebrachotannin, chestnut tannin, tannin of persimmon and mangrove tannin.

Preparation of the Condensation Product of Component (A)

In the present invention, the condensation product as component (A), which is an effective constituent of the polymer scale preventive agent, can be prepared by selecting the above-described combination of an aromatic amine compound (hereinafter referred to as "component (a)") and an aromatic hydroxyl compound condensate of any of (I) to (V) (hereinafter referred to as "component (b)"), and reacting the components (a) and (b) in the presence of a suitable catalyst at a temperature of room temperature to about 200° C. in a suitable medium for about 0.5 to 150 hours.

As the medium for reaction, preferred are organic solvents such as, e.g., alcohols, ketones and esters, and mixed solvents of water and an organic solvent compatible with water. The organic solvents compatible with water include, for example, alcohols such as methanol, ethanol and propanol, ketones such as acetone, methyl ethyl ketone, and the like, and esters such as methyl acetate and ethyl acetate.

The catalyst suitable for the reaction includes, for example, oxyacids or salts thereof such as iodic acid, periodic acid, potassium periodate and sodium perchlorate, peroxides such as hydrogen peroxide, sodium peroxide, benzoyl peroxide, potassium persulfate, ammonium persulfate, peracetic acid, cumene hydroperoxide, perbenzoic acid and p-menthane hydroperoxide, azo compounds such as $\alpha,\alpha'$-azobisisobutyronitrile and $\alpha,\alpha'$-azobis-2,4-dimethylvaleronitrile, and metallic salts such as ferrous oxide, ferric oxide, copper sulfate, cuprous chloride, and ferric chloride.

Although the addition of the component (b) to a reaction solution containing the component (a) may be begun at the start of the condensation reaction, it is preferred that the condensation reaction of the component (a) alone is first carried out and thereafter the component (b) begins to be added.

Although the amounts of the components (a) and (b) subjected to the condensation reaction depends on the kinds of the components (a), (b) and catalyst, reaction temperature, reaction time, etc., normally the aromatic hydroxyl compound condensate (b) is preferably used in an amount of about 0.5 to about 10 parts by weight per part by weight of the aromatic amine compound (a). If the amount of the component (b) is too small relative to that of the component (a), a polymeric product that is poor in initial coloration is obtained when the resulting condensation product is used as a polymer scale preventive agent. If the amount of the component (b) is too large, the resulting condensation product is poor in prevention of polymer scale. Besides, the catalyst is preferably used in an amount of 0.01 to 1.50 parts by weight per part by weight of the aromatic amine compound (a).

As the condensation product of component (A) in the present invention, particularly preferred are those formed from an aromatic amine compound of the above general formula (2) or (3) and a condensate of (I).

The polymer scale preventive agent comprising the condensation product (A) of the components (a) and (b) as an effective constituent is used for forming a coating on, for example, the inner wall surfaces of a polymerization vessel, and the deposition of polymer scale on the inner wall surfaces, etc. is thereby prevented. To form such a coating, the polymer scale preventive agent is used in a liquid state, specifically as a solution or a dispersion. That is, it is used as a coating liquid.

Preparation of Coating Liquid

For example, the coating liquid mentioned above may be prepared by adding a solvent described below as required to a solution containing the condensation product of the components (a) and (b) resulting from the condensation reaction. Alternatively, the coating liquid may be prepared by removing the solvent from the solution containing the condensation product resulting from the condensation reaction, grinding the resulting solid condensation product, and adding a solvent described below to the ground product obtained, or by putting the condensation product-containing solution into cold water to allow the condensation product to form sediment, filtering off and drying the sediment, and adding a solvent described below to the dried sediment.

Solvents to be used for preparation of the coating liquid include, for example, water; alcohols such as methanol, ethanol, propanol, butanol, 2-butanol, 2-methyl-1-propanol, 2-methyl-2-propanol, 3-methyl-l-butanol, 2-methyl-2-butanol, 2-pentanol, etc.; ketones such as acetone, methyl ethyl ketone, methyl isobutyl ketone, etc.; esters such as methyl formate, ethyl formate, methyl acetate, ethyl acetate, methyl acetoacetate, etc.; ethers such as 4-methyldioxolane, ethylene glycol diethyl ether, etc.; furans; and aprotic solvents such as dimethylformamide, dimethyl sulfoxide and acetonitrile. These solvents may be used singly or as a mixed solvent of two or more thereof on a case-by-case basis.

Among the solvents above, particularly preferred are water, and mixed solvents of water and an organic solvent compatible with water. The organic solvent compatible with water includes, for example, alcohols such as methanol, ethanol and propanol, ketones such as acetone and methyl ethyl ketone, and esters such as methyl acetate and ethyl acetate. The mixed solvents of water and an organic solvent compatible with water preferably contains the organic solvent in such an amount that there is no fear about ignition or explosion and safety in handling is ensured as to virulence, etc. Specifically, the amount of the organic solvent is preferably 50% by weight or less, and more preferably 30% by weight or less.

In the case where water or a mixed solvent of water and an organic solvent compatible with water is used as the solvent for a coating liquid, the coating liquid is preferably alkaline, and the polymer scale preventing effect is thereby enhanced. This is presumably because alkalization of the coating liquid increases the solubility of the condensation product of the components (a) and (b) in the solvent and makes the coating liquid uniform. The coating liquid preferably has a pH of 7.5 to 13.5, and more preferably 8.0 to 12.5. As an alkaline compound to be used for adjusting pH, for example, alkali metal compounds and ammonium compounds, such as LiOH, NaOH, KOH, $Na_2CO_3$, $Na_2HPO_4$, $NH_4OH$ and the like, as well as organic amine compounds such as ethylenediamine, monoethanolamine, triethanolamine and the like, can be used.

The concentration of the condensation product of the components (a) and (b) is not limited as long as a total coating weight described later can be obtained. Normally, the concentration is in the range of about 0.001 to about 15% by weight, preferably 0.01 to 5% by weight.

In order to further enhance the scale preventive effect, to the coating liquid described above are added (B) a water-soluble polymeric compound and (C) at least one compound selected from the group consisting of a colloidal silica and an alkali metal silicate. Presumably, these additives (B) and (C) interact with the condensation product of the components (a) and (b), so that the component (B) improves hydrophilic nature of the surface of the coating and the component (C) increases the adhesion of the coating to the inner wall, etc. of the polymerization vessel.

(B) Water-Soluble Polymeric Compound

The water-soluble polymeric compounds include, for example, amphoteric polymeric compounds such as gelatin and casein, anionic polymeric compounds such as polyacrylic acid, sulfonated polystyrene, carboxymethyl cellulose, and alginic acid, cationic nitrogen-containing polymeric compounds such as polyvinyl pyrrolidone and polyacrylamide, hydroxyl-containing polymeric compounds such as polyvinyl alcohol, hydroxyethyl cellulose, hydroxypropyl cellulose and pectin.

Among the water-soluble polymeric compounds above, preferred are gelatin, casein, polyacrylic acid, carboxymethyl cellulose, polyvinyl pyrrolidone and pectin.

The amount of the water-soluble polymeric compound (B) is preferably in the range of 0.01 to 10 parts by weight, and more preferably from 0.05 to 3 parts by weight per part by weight of the condensation product (A).

(C) Colloidal Silica and/or Alkali Metal Silicate

Colloidal silica is a colloid in which ultrafine particles of silicon dioxide (silica) are dispersed in an aqueous medium or a non-aqueous medium such as methanol, propanol, ethylene glycol, or the like. The colloidal particles generally have a particle diameter of 1 to 100 $\mu$m.

It is well-known that colloidal silica, for example, dispersed in an aqueous medium can be typically produced by adding hydrochloric acid to an aqueous sodium silicate solution, but production methods are not limited thereto. Any production methods can be used as long as the colloidal silica described above is produced.

The silicates of alkali metals include, for example, metasilicates ($M_2SiO_3$), orthosilicates ($M_4SiO_4$), bisilicates ($M_2Si_2O_5$), trisilicates ($M_3Si_3O_7$) and sesquisilicates ($M_4Si_3O_{10}$) of alkali metals such as lithium, sodium and potassium (where M stands for an alkali metal such as lithium, sodium or potassium), and water glass.

The amount of the component (C) is preferably in the range of 0.01 to 20 parts by weight, more preferably from 0.05 to 5 parts by weight per part by weight of the condensation product (A).

In using the above component (B) and component (C), it is preferable to use the water-soluble polymeric compound and the colloidal silica in combination or to use the water-soluble polymeric compound and the alkali metal silicate in combination.

Where the water-soluble polymeric compound is used in combination with the colloidal silica, the colloidal silica is used in an amount of preferably 5 to 3,000 parts by weight, more preferably 50 to 1,000 parts by weight per 100 parts by weight of the water-soluble polymeric compound. Where the water-soluble polymeric compound is used in combination with the alkali metal silicate, the alkali metal silicate is used in an amount of preferably 5 to 3,000 parts by weight, more preferably 50 to 1,000 parts by weight per 100 parts by weight of the water-soluble polymeric compound.

Formation of the Coating

To form a coating on the inner wall surfaces of a polymerization vessel using the coating liquid prepared as above, the coating liquid is applied to the inner wall surfaces of the vessel and then dried sufficiently at a temperature from room temperature to 100° C., for instance, followed by washing with water if necessary.

The coating is preferably formed on not only the polymerization vessel inner wall surfaces but also other parts with which the monomer comes into contact during polymerization. For example, on a stirring shaft, stirring blades, condensers, headers, search coil, bolts, nuts, etc.

More preferably, for formation of the coating, the coating liquid is applied to areas with which monomers do not come into contact during polymerization but on which polymer scale may deposit, for example, the areas with which unreacted monomers come into contact of an unreacted monomer recovery system; specifically the inner surfaces, etc. of equipment and pipes of the recovery system. Specifically, such areas include the inner surfaces of monomer distillation columns, condensers, monomer stock tanks and valves.

The method of applying the coating liquid is not particularly limited, and includes, for example, brush coating, spray coating, a method of filling the polymerization vessel with the coating liquid followed by withdrawal thereof, and the automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the coating liquid, is not limited, either. Following methods can be used. That is, a method in which, after the coating liquid is applied, hot air with a suitable elevated temperature is blown to the coated surface, and a method in which the inner wall surface of a polymerization vessel and the surfaces of other parts to be coated are previously heated to from 30° to 80° C., and the coating liquid is directly applied to the heated inner wall surfaces, etc. After dried, the coated surfaces are washed with water if necessary.

The coating thus obtained normally has a total coating weight after dried of normally 0.001 to 5 $g/m^2$, and preferably from 0.05 to 2 g/m2.

The coating operation may be conducted every one to ten-odd batches of polymerization. The formed coating has good durability and retains the scale-preventing action; therefore the coating operation may be performed every several batches of polymerization. Thus, the polymerization vessel can be used repeatedly without deposition of polymer scale, and productivity is improved.

POLYMERIZATION

After the formation of the coating on the inner wall surfaces of a polymerization vessel, and preferably other parts with which monomer may come into contact during polymerization, polymerization is carried out in accordance with conventional procedures. That is, a monomer having an ethylenic double bond, a polymerization initiator, and optionally a polymerization medium such as water, etc., a dispersing agent such as suspending agents, solid dispersing agents, and nonionic or anionic surfactants, and the like are charged into the polymerization vessel, followed by carrying out polymerization according to conventional methods.

The monomer having an ethylenic double bond which may be polymerized by the process of the present invention includes, for example, vinyl halides such as vinyl chloride; vinyl esters such as vinyl acetate and vinyl propionate; acrylic acid, methacrylic acid, and esters or salts thereof; maleic acid, fumaric acid, and esters or salts thereof; diene monomers such as butadiene, chloroprene and isoprene; styrene, α-methylstyrene, acrylonitrile, vinylidene halides, and vinyl ethers.

There are no particular limitations on the type of polymerization to which the process of the present invention can be applied. The inventive process is effective in any type of polymerization such as suspension polymerization, emulsion polymerization, solution polymerization, bulk polymerization, and gas phase polymerization. Particularly, the inventive process is more suitable to polymerizations in an aqueous medium such as suspension or emulsion polymerization.

In the following, general conditions are described on each type of polymerizations.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 kgf/cm$^2$.G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to from 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. For example, polymerization is carried out at 30° to 80° C. in the case of vinyl chloride, and at 50° to 150° C. in the case of styrene.

The process of the present invention makes it possible to prevent polymer scale from depositing, independent of materials constituting the inner wall, etc. of a polymerization vessel. For example, the inventive process can prevent deposition of polymer scale even in the cases where polymerization is carried out in a polymerization vessel made of a steel including stainless steel or lined with glass.

Any additive materials that have been conventionally added in a polymerization system can be used without any limitation. More specifically, the process of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumenehydroperoxide, cyclohexanone peroxide, t-butyl peroxypivalate, bis(2-ethoxylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, and p-menthane hydroperoxide; suspension agents comprised of natural or synthetic polymeric compounds such as partially saponified polyvinyl alcohols, polyacrylic acids, vinyl acetate/maleic anhydride copolymers, cellulose derivatives such as hydroxypropylmethyl cellulose, and natural or synthetic polymeric compounds such as gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

EXAMPLES

The present invention will now be described in detail below, with reference to working examples thereof and comparative examples. In each table below, experiments marked with * are comparative examples and the other experiments are working examples of the present invention.

(I) Production of Aromatic Hydroxyl Compound-acetone Condensates

Production Example 1

Pyrogallol-acetone Condensate

Pyrogallol (200 g) was dissolved in 1.4 kg of acetone, and 20 g of phosphorus oxychloride was added to the solution obtained. The resulting mixture was allowed to stand at room temperature overnight. The mixture was then added dropwise to water under stirring. The sediment formed was filtered off, dissolved in a small amount of acetone, and the acetone solution thus obtained was poured into a plenty amount of water. The sediment formed in the water was filtered off and dried to give a pyrogallol-acetone condensate. The melting point was measured to be 200°–210° C.

Production Example 2

Resorcinol-acetone Condensate

The procedure of Production Example 1 was repeated except that resorcinol was used in place of the pyrogallol, to give a resorcinol-acetone condensate with a melting point of 170°–180° C.

(II) Production of Aromatic Hydroxyl Compound-aldehyde Condensates

Production Example 3

Phenol-formaldehyde condensate

Phenol (300 g), 220 g of 37% aqueous formaldehyde solution (molar ratio of phenol: formaldehyde=1: 0.85) and 0.3 ml of 35% concentrated hydrochloric acid were mixed, and the mixture was heated at 85° C. under reflux with stirring for 5 hours. The mixture was subsequently cooled and then added dropwise to water under stirring. The sediment formed was filtered off, and dissolved in a small amount of methanol. The resulting methanol solution was added to a plenty of water. The sediment formed in the water was filtered off and dried to give a phenolformaldehyde condensate.

Production Example 4

Pyrogallol-formaldehyde Condensate

The procedure of Production Example 3 was repeated except that pyrogallol was used in place of phenol, to give a pyrogallol-formaldehyde condensate.

Production Example 5

2,3-Dihydroxynaphthalene-formaldehyde condensate

The procedure of Production Example 3 was repeated except that phenol was replaced with 2,3-dihydroxynaphthalene, the 35% concentrated hydrochloric acid was replaced with 0.1 ml of phosphoric acid, and the reaction solution to be subjected to reflux was added with 100 g of acetone and then was heated under reflux, to give a 2,3-dihydroxynaphthalene-formaldehyde condensate.

Production Example 6

1,4,5,8-Tetrahydroxynaphthalene-formaldehyde Condensate

The procedure of Production Example 5 was repeated, except that the 2,3-dihydroxynaphthalene was replaced with 1,4,5,8-tetrahydroxynaphthalene, to give a 1,4,5,8-tetrahydroxynaphthalene-formaldehyde condensate.

(III) Aromatic hydroxyl compound condensate

Production Example 7

2,7-Dihydroxynaphthalene condensate

Fifty (50) g of 2,7-dihydroxynaphthalene was dissolved in 1,000 g of methanol, and to the solution obtained 30 g of 30% aqueous hydrogen peroxide was added under stirring. The mixture obtained was heated at 80° C. under reflux for 5 hours. After cooled, the reaction mixture was added to water to settle the product. The sediment formed was filtered off and dried to give a 2,7-dihydroxynaphthalene condensate.

(IV) Aromatic Hydroxyl Compound-aromatic Amine Compound Condensates

Production Example 8

2,7-Dihydroxynaphthalene-p-aminophenol Condensate

To 10 liters of acetone were added 50 g of 2,7-dihydorxynaphthalene, 50 g of p-aminophenol and 10 g of periodic acid. The mixture obtained was reacted at 80° C. for 5 hours, and thereafter was cooled to give a solution of 2,7-dihydroxynaphthalene-p-aminophenol in acetone.

Production Example 9

Catechol-4-aminodiphenylamine condensate

In 10 liters of methanol were dissolved 50 g of catechol and 50 g of 4-aminodiphenylamine. The pH of the solution obtained was adjusted to 8.0 by adding triethanolamine. Subsequently, 30 g of 30% aqueous hydrogen peroxide was added to the solution. The resulting mixture was reacted at 130° C. for 5 hours, and thereafter cooled to give a solution of a catechol-4aminodiphenylamine condensate in methanol.

Production of Condensation Products of Components (a) and (b)

Production Example 10

Production of Condensation Product No. 1

An autoclave was charged with 3 kg of methanol, 30 g of 1,8-diaminonaphthalene and 75 g of the pyrogallol-acetone condensate, and these were mixed by stirring at room temperature to prepare a methanol solution.

Separately, 15 g of potassium periodate was added to 2 kg of water and dissolved therein by stirring at room temperature. The aqueous solution thus obtained was added to the methanol solution prepared above, and after mixing the mixture obtained was heated to 80° C. and reacted at the temperature for 5 hours. Subsequently, the reaction mixture was cooled, and then was mixed with water in an amount 5 times that of the reaction mixture. The sediment formed was filtered off and dried to give the desired condensation product (No.1). Yield: 88%.

Production Example 11

Productions of Condensation Product Nos. 2 to 17

In each production, the procedure of Production Example 10 was repeated, except that an aromatic amine compound (a), an aromatic hydroxyl compound condensate (b), a catalyst and a solvent given in Table 1 were used, and reaction was carried out under the conditions with respect to temperature and time specified in Table 1, to give a condensation product of Nos. 2 to 17.

The batch above comprising the operations from forming a coating through polymerizing to washing with water was repeated 100 times and a total of 130

TABLE 1

| Condensation product No. | (a) Aromatic amine compound | (b) Aromatic hydroxyl compound condensate | Catalyst | (a):(b):catalyst (wt. ratio) | Solvent (wt. ratio) | Reaction temp. (°C.) | Reaction time (Hr.) |
|---|---|---|---|---|---|---|---|
| 1 | 1,8-Diaminonaphthalene | Pyrogallol-acetone condensate | Potassium periodate | 100:250:50 | Methanol:Water (60:40) | 80 | 5 |
| 2* | 1,8-Diaminonaphthalene | — | Potassium periodate | 100:—:50 | Methanol:Water (60:40) | 80 | 5 |
| 3* | 1,8-Diaminonaphthalene | Pyrogallol-acetone condensate | — | 100:250:— | Methanol:Water (60:40) | 80 | 5 |
| 4* | — | Pyrogallol-acetone condensate | Potassium periodate | —:250:50 | Methanol:Water (60:40) | 80 | 5 |
| 5 | 4-Aminodiphenylamine | Resorcinol-acetone condensate | Iodic acid | 100:300:10 | Methanol:Water (50:50) | 50 | 5 |
| 6 | 1,5-Diaminonaphthalene | Phenol-formaldehyde condensate | Potassium persulfate | 100:100:30 | Methanol:Water (70:30) | 150 | 0.5 |
| 7 | 1,8-Diaminonaphthalene | 2,3-Dihydroxynaphthalene-formaldehyde condensate | Sodium peroxide | 100:100:5 | Methanol:Water (80:20) | 80 | 3 |
| 8 | 1,8-Diaminonaphthalene | 1,4,5,8-Tetrahydroxynaphthalene-formaldehyde condensate | Iodic acid | 100:900:20 | Methanol:Water (80:20) | 60 | 5 |
| 9 | 2,3-Diaminonaphthalene | 2,7-Dihydroxynaphthalene-p-aminophenol condensate | Hydrogen peroxide | 100:800:50 | Methanol:Water (90:10) | 25 | 20 |
| 10 | 4-Aminodiphenylamine | Pyrogallol-acetone condensate | Periodic acid | 100:300:50 | Methanol:Water (80:20) | 50 | 5 |
| 11* | 4-Aminodiphenylamine | Pyrogallol-formaldehyde condensate | Periodic acid | 100:300:50 | Methanol:Water (80:20) | 50 | 5 |
| 12 | 1,8-Diaminonaphthalene | 2,7-Dihydroxynaphthalene condensate | Periodic acid | 100:500:50 | Methanol:Water (90:10) | 80 | 3 |
| 13 | 4-Methoxy-orthophenylenediamine | Pyrogallol-acetone condensate | Potassium periodate | 100:400:30 | Methanol:Water (50:50) | 80 | 3 |
| 14* | 4-Methoxy-orthophenylenediamine | Pyrogallol-formaldehyde condensate | Potassium periodate | 100:400:30 | Methanol:Water (50:50) | 80 | 3 |
| 15 | 1,8-Diaminonaphthalene | Catechol-4-aminodiphenylamine condensate | Potassium persulfate | 100:100:20 | Methanol:Water (50:50) | 50 | 5 |
| 16 | 1,8-Diaminonaphthalene | Wattle tannin | Potassium periodate | 100:400:100 | Methanol:Water (40:60) | 50 | 5 |
| 17 | 1,5-Diaminonaphthalene | Mimosa tannin | Periodic acid | 100:100:20 | Methanol:Water (50:50) | 60 | 10 |

Example 1 (Experiment Nos. 101 to 120)

In each experiment, polymerization was conducted using a stainless steel polymerization vessel with an inner capacity of 1,000 liters and having a stirrer, as described below.

In each experiment, using a condensation product (A), water-soluble polymeric compound (B), colloidal silica or alkali metal silicate (C), pH adjuster and solvent specified in Table 2, a coating liquid having a concentration and a pH given in Table 2 was prepared. The colloidal silicas used in the present Example 1 are given in Table 3.

The coating liquid was applied to the inner wall, the stirring shaft, the stirring blades and other areas with which a monomer comes into contact of the polymerization vessel. The applied coating liquid was dried by heating at 40° C. for 15 minutes to form a coating, which was then washed with water.

Thereafter, into the polymerization vessel in which the coating was formed as above, 400 kg of water, 200 kg of vinyl chloride, 250 g of a partially saponified polyvinyl alcohol, 25 g of hydroxypropyl methyl cellulose and 70 g of 3,5,5-trimethylhexanoyl peroxide were charged, followed by polymerization under stirring at 66° C. for 6 hours. After completion of the polymerization, the produced polymer was taken out and unreacted monomer was recovered out of the polymerization vessel. Subsequently, the inside of the polymerization vessel was washed with water and residual resin was removed.

times. After the 100th batch and after the 130th batch, the amount of polymer scale on an area located in the liquid phase during polymerization and on an area around the interface between the gas and liquid phases, was measured according the method below.

The number of fish eyes which may appear when a polymer is formed into sheet was measured with respect to the polymers produced in the experiments according to the method below.

Further, to evaluate initial coloration at the time a polymer is formed into sheet, luminosity index L was measured according to the method below.

Measurement of the Amount of Polymer Scale

The scale deposited in an area of 10 cm square on the inner wall is scraped off with a stainless steel spatula as completely as possible to be confirmed with naked eyes, and then the scraped scale is weighted on a balance. Thereafter, the amount of the deposited scale per area of 1 m$^2$ is obtained by multiplying the measured value by 100.

Measurement of Fish Eyes

A hundred parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The sheet is examined for the number of fish eyes per 100 cm² by light transmission.

Measurement of Luminosity Index L

A hundred parts by weight of a vinyl chloride polymer, 1 part by weight of a tin laurate stabilizing agent (trade name: TS-101, product of Akisima Chemical Co.) and 0.5 part by weight of cadmium stabilizing agent (trade name: C-100J, product of Katsuta Kako Co.), and 50 parts by weight of DOP are kneaded at 160° C. for 5 minutes with a twin roll mill, and then formed into a sheet 1 mm thick. Subsequently, this sheet is placed in a mold measuring 4 cm ×4 cm×1.5 cm (depth), and molded under heating at 160° C. and a pressure of 65 to 70 kgf/cm² to prepare a test specimen. This test specimen is measured for luminosity index L in the Hunter's color difference equation described in JIS Z 8730 (1980). The lower initial coloration, the more the value of L.

The value of L was determined as follows. The stimulus value Y of XYZ color system is determined according to the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 is adopted. Next, L is calculated based on the equation: $L = 10Y^{\frac{1}{2}}$ described in JIS Z 8730 (1980).

The results are given in Table 2.

TABLE 2

| | | Coating liquid | | | | | | |
|---|---|---|---|---|---|---|---|---|
| Exp. No. | (A) Condensation product No. | (B) Water-soluble polymeric compound | (C) Colloidal silica or alkali metal silicate | Total conc. of (A) + (B) + (C) (%) | (A):(B):(C) (wt. ratio) | pH adjuster | pH | Solvent (wt. ratio) |
| 101 | 1 | Gelatin | ① | 0.5 | 100:100:200 | NaOH | 9.5 | Water:Methanol (80:20) |
| 102* | 2* | Gelatin | ① | 0.5 | 100:100:200 | NaOH | 9.5 | Water:Methanol (80:20) |
| 103* | 3* | Gelatin | ① | 0.5 | 100:100:200 | NaOH | 9.5 | Water:Methanol (80:20) |
| 104* | 4* | Gelatin | ① | 0.5 | 100:100:200 | NaOH | 9.5 | Water:Methanol (80:20) |
| 105* | 1 | — | ① | 0.5 | 100:0:200 | NaOH | 9.5 | Water:Methanol (80:20) |
| 106* | 1 | Gelatin | — | 0.5 | 100:100:0 | NaOH | 9.5 | Water:Methanol (80:20) |
| 107 | 5 | Polyacrylic acid | ① | 0.5 | 100:50:100 | NaOH | 9.5 | Water:Methanol (80:20) |
| 108 | 6 | Polyacrylic acid | ③ | 0.5 | 100:100:500 | NaOH | 10.5 | Water:Methanol (80:20) |
| 109 | 7 | Carboxymethyl cellulose | ② | 0.5 | 100:200:100 | NaOH | 10.0 | Water:Methanol (90:10) |
| 110 | 8 | Gelatin | ④ | 0.3 | 100:100:300 | KOH | 9.0 | Water:Methanol (90:10) |
| 111 | 9 | Polyvinyl alcohol | ⑥ | 0.5 | 100:200:300 | NaOH | 10.0 | Water:Methanol (90:10) |
| 112 | 10 | Gelatin | ① | 0.5 | 100:100:200 | NaOH | 9.5 | Water:Methanol (80:20) |
| 113* | 11* | Gelatin | ① | 0.5 | 100:100:200 | NaOH | 9.5 | Water:Methanol (80:20) |
| 114 | 12 | Polyacrylic acid | ④ | 0.8 | 100:200:300 | KOH | 9.0 | Water:Methanol (90:10) |
| 115 | 13 | Gelatin | ① | 0.5 | 100:100:200 | NaOH | 9.5 | Water:Methanol (80:20) |
| 116* | 14* | Polyacrylic acid | ③ | 0.5 | 100:50:100 | NaOH | 9.5 | Water:Methanol (80:20) |
| 117* | 14* | Gelatin | ① | 0.5 | 100:100:200 | NaOH | 9.5 | Water:Methanol (80:20) |
| 118 | 15 | Carboxymethyl cellulose | ④ | 0.8 | 100:50:300 | KOH | 9.5 | Water:Methanol (90:10) |
| 119 | 16 | Sulfonated polystyrene | ⑦ | 0.5 | 100:50:200 | NaOH | 11.0 | Water:Methanol (90:10) |
| 120 | 17 | Gelatin | ⑤ | 0.3 | 100:100:500 | KOH | 9.5 | Water:Methanol (95:5) |

| | Polymerization results after the 100th batch | | | | Polymerization results after the 130th batch | | | |
|---|---|---|---|---|---|---|---|---|
| | Polymer scale amount (g/m²) | | Number of fish eyes | Luminosity index (L) | Polymer scale amount (g/m²) | | Number of fish eyes | Luminosity index (L) |
| Exp. No. | Liquid phase | Around gas-liquid interface | | | Liquid phase | Around gas-liquid interface | | |
| 101 | 0 | 7 | 8 | 72.5 | 0 | 12 | 9 | 72.5 |
| 102* | 18 | 91 | 28 | 68.1 | — | — | — | — |
| 103* | 38 | 180 | 35 | 68 0 | — | — | — | — |
| 104* | 29 | 150 | 33 | 70.5 | — | — | — | — |
| 105* | 3 | 57 | 20 | 69.1 | 45 | 280 | 38 | 67.9 |
| 106* | 13 | 81 | 23 | 69.3 | — | — | — | — |
| 107 | 0 | 10 | 7 | 72.5 | 0 | 12 | 8 | 72.5 |
| 108 | 0 | 9 | 7 | 72.5 | 0 | 15 | 9 | 72.5 |
| 109 | 0 | 10 | 7 | 72.5 | 0 | 18 | 9 | 72.5 |
| 110 | 0 | 10 | 8 | 72.5 | 0 | 16 | 10 | 72.5 |

TABLE 2-continued

| 111  | 0 | 8  | 6  | 72.5 | 0  | 19  | 9  | 72.5 |
|------|---|----|----|------|----|-----|----|------|
| 112  | 0 | 10 | 7  | 72.5 | 0  | 13  | 8  | 72.5 |
| 113* | 1 | 31 | 11 | 72.4 | 18 | 110 | 25 | 68.6 |
| 114  | 0 | 11 | 8  | 72.5 | 0  | 21  | 10 | 72.5 |
| 115  | 0 | 12 | 7  | 72.5 | 0  | 20  | 10 | 72.5 |
| 116* | 1 | 32 | 12 | 72.4 | 21 | 230 | 35 | 68.4 |
| 117* | 1 | 35 | 12 | 72.4 | 17 | 190 | 34 | 68.5 |
| 118  | 0 | 11 | 7  | 72.5 | 0  | 18  | 9  | 72.5 |
| 119  | 0 | 8  | 6  | 72.5 | 0  | 17  | 9  | 72.5 |
| 120  | 0 | 9  | 6  | 72.5 | 0  | 15  | 9  | 72.5 |

TABLE 3

| Colloidal silica | Diameter of colloidal particles | Name of article | Manufacturer |
|---|---|---|---|
| ① | 5~7 gm | Snowtex CXS-9 | Nissan Chemical Industries, Ltd. |
| ② | 7~9 gm | Snowtex S | Nissan Chemical Industries, Ltd. |
| ③ | 10~20 gm | Snowtex O | Nissan Chemical Industries, Ltd. |
| ④ | 10~20 gm | Methanol silica sol | Nissan Chemical Industries, Ltd. |
| ⑤ | 10~20 gm | Ethylene glycol silica sol | Nissan Chemical Industries, Ltd. |
| ⑥ | 10~20 gm | Snowtex N | Nissan Chemical Industries, Ltd. |
| ⑦ | 10~20 gm | Snowtex C | Nissan Chemical Industries, Ltd. |

Example 2 (Experiment Nos. 201 to 219)

In each experiment, polymerization was conducted using a stainless steel polymerization vessel with an inner capacity of 20 liters and having a stirrer, as described below.

In each experiment, using a condensation product (A), water-soluble polymeric compound (B), colloidal silica or alkali metal silicate (C), pH adjuster and solvent specified in Table 4, a coating liquid having a concentration and a pH given in Table 4 was prepared. The same colloidal silicas as used in Example 1 above (namely, those given in Table 3) were used in the present Example 2 also.

Using the coating liquid thus prepared, a coating was formed on areas in the polymerization vessel in the same manner as in Example 1.

Thereafter, into the polymerization vessel in which the coating was thus formed, 9 kg of water, 225 g of sodium dodecylbenzenesulfonate, 12 g of t-dodecyl mercaptan and 13 g of potassium peroxodisulfate were charged. After the inside of the polymerization vessel was replaced with a nitrogen gas, 1.3 kg of styrene and 3.8 kg of butadiene were charged, followed by polymerization at 50° C. for 20 hours. After completion of the polymerization, the produced polymer was taken out and unreacted monomer was recovered out of the polymerization vessel. Subsequently, the inside of the polymerization vessel was washed with water and residual resin was removed.

The batch comprising the operations from forming a coating through polymerizing to washing with water was repeated 70 times. After the 107th batch, the amount of polymer scale on an area located in the liquid during polymerization and on an area around the interface between the gas and liquid phases, was measured in the same manner as in Example 1.

Further, to evaluate initial coloration at the time a polymer is formed into sheet, luminosity index L was measured according to the method below.

The results are given in Table 4.

Measurement of Luminosity Index L

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a mold measuring 9×9×0.1 cm (depth), heated at 195° C. under a pressure of 50 to 60 kgf/cm² and press molded under the final pressure of 80 kgf/cm² to prepare a test specimen.

This test specimen was measured for luminosity index L in the same manner as in Example 1.

TABLE 4

| | | | | Coating liquid | | | | | |
|---|---|---|---|---|---|---|---|---|---|
| Exp. No. | (A) Condensation product No. | (B) Water-soluble polymeric compound | (C) Colloidal silica or alkali metal silicate | Total conc. of (A) + (B) + (C) (%) | (A):(B):(C) (wt. ratio) | pH adjuster | pH | Solvent (wt. ratio) | |
| 201 | 1 | Polyacrylamide | ① | 0.5 | 100:100:200 | NaOH | 9.5 | Water:Methanol (90:10) | |
| 202* | 2* | Polyacrylamide | ① | 0.5 | 100:100:200 | NaOH | 9.5 | Water:Methanol (90:10) | |
| 203* | 3* | Polyacrylamide | ① | 0.5 | 100:100:200 | NaOH | 9.5 | Water:Methanol (90:10) | |
| 204* | 4* | Polyacrylamide | ① | 0.5 | 100:100:200 | NaOH | 9.5 | Water:Methanol (90:10) | |
| 205* | 1 | — | ① | 0.5 | 100:0:200 | NaOH | 9.5 | Water:Methanol (90:10) | |
| 206* | 1 | Polyacrylamide | — | 0.5 | 100:100:0 | NaOH | 9.5 | Water:Methanol (90:10) | |
| 207 | 5 | Poliacrylic acid | ② | 0.5 | 100:100:200 | NaOH | 9.5 | Water:Methanol (90:10) | |
| 208 | 6 | Sulfonated polystyrene | ③ | 0.5 | 100:50:50 | NaOH | 9.5 | Water:Methanol (90:10) | |
| 209 | 7 | Polyvinyl alcohol | ⑥ | 0.5 | 100:50:100 | NaOH | 9.5 | Water:Methanol (90:10) | |

TABLE 4-continued

| Exp. No. | | | | | | | | |
|---|---|---|---|---|---|---|---|---|
| 210 | 8 | Polyacrylic acid | ⑤ | 0.5 | 100:100:500 | KOH | 9.5 | Water:Methanol (95:5) |
| 211 | 9 | Hydroxymethyl cellulose | ⑦ | 0.5 | 100:50:200 | NaOH | 9.0 | Water:Methanol (95:5) |
| 212 | 10 | Polyacrylamide | ① | 0.5 | 100:100:200 | NaOH | 9.5 | Water:Methanol (90:10) |
| 213* | 11* | Polyacrylamide | ① | 0.5 | 100:100:200 | NaOH | 9.5 | Water:Methanol (90:10) |
| 214 | 12 | Polyacrylic acid | ④ | 0.5 | 100:50:100 | NaOH | 10.0 | Water:Methanol (90:10) |
| 215 | 13 | Polyacrylamide | ④ | 0.5 | 100:100:200 | NaOH | 9.5 | Water:Methanol (90:10) |
| 216* | 14* | Polyacrylic acid | ③ | 0.5 | 100:100:200 | NaOH | 9.5 | Water:Methanol (90:10) |
| 217* | 14* | Polyacrylamide | ① | 0.5 | 100:100:200 | NaOH | 9.5 | Water:Methanol (90:10) |
| 218 | 15 | Polyacrylic acid | ① | 0.5 | 100:100:300 | KOH | 10.0 | Water:Methanol (90:10) |
| 219 | 16 | Alginic acid | ① | 0.5 | 100:100:500 | NaOH | 9.0 | Water:Methanol (95:5) |
| 220 | 17 | Polyacrylic acid | ① | 0.5 | 100:100:500 | KOH | 9.5 | Water:Methanol (90:10) |

| | Polymerization results after the 50th batch | | | Polymerization results after the 70th batch | | |
|---|---|---|---|---|---|---|
| | Polymer scale amount (g/m$^2$) | | Luminosity | Polymer scale amount (g/m$^2$) | | Luminosity |
| Exp. No. | Liquid phase | Around gas-liquid interface | index (L) | Liquid phase | Around gas-liquid interface | index (L) |
| 201 | 0 | 11 | 85.7 | 0 | 16 | 85.5 |
| 202* | 14 | 59 | 82.2 | — | — | — |
| 203* | 70 | 580 | 79.3 | — | — | — |
| 204* | 31 | 160 | 84.5 | — | — | — |
| 205* | 2 | 48 | 85.1 | 31 | 410 | 82.5 |
| 206* | 11 | 52 | 84.3 | — | — | — |
| 207 | 0 | 12 | 85.7 | 0 | 16 | 82.5 |
| 208 | 0 | 16 | 85.6 | 0 | 22 | 85.6 |
| 209 | 0 | 14 | 85.7 | 0 | 20 | 85.6 |
| 210 | 0 | 12 | 85.7 | 0 | 23 | 85.6 |
| 211 | 0 | 13 | 85.6 | 0 | 21 | 85.6 |
| 212 | 0 | 16 | 85.7 | 0 | 17 | 85.6 |
| 213* | 1 | 39 | 85.6 | 13 | 180 | 82.8 |
| 214 | 0 | 13 | 85.6 | 0 | 23 | 85.6 |
| 215 | 0 | 15 | 85.7 | 0 | 19 | 85.6 |
| 216* | 2 | 47 | 85.6 | 21 | 290 | 82.0 |
| 217* | 2 | 44 | 85.6 | 19 | 260 | 82.0 |
| 218 | 0 | 14 | 85 6 | 0 | 18 | 85.6 |
| 219 | 0 | 17 | 85.6 | 0 | 22 | 85.6 |
| 220 | 0 | 15 | 85.6 | 0 | 21 | 85.6 |

What is claimed is:

1. A process of producing a polymer of a monomer having an ethylenic double bond, which comprises polymerizing the monomer in a polymerization vessel having a coating on its inner wall surfaces, wherein said coating comprises: (A) at least one condensation product selected from the group consisting of:

condensation products of an aromatic amine compound selected from the group consisting of the compounds having the following general formulas (1) to (3):

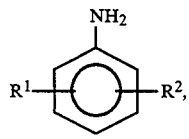

(1)

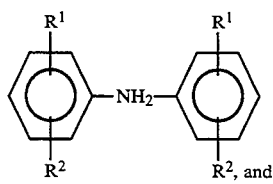

(2)

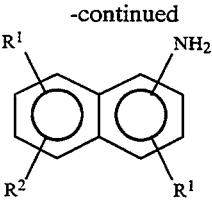

(3)

wherein in the formulas (1) to (3) $R^1$ is —H, —NH$_2$, —Cl, —OH, —NO$_2$, —COCH$_3$, —OCH$_3$, —N(CH$_3$)$_2$ or an alkyl group of 1 to 3 carbon atoms, and $R^2$ is —H, —NH$_2$, —OH, —CH$_3$, —COOH or —SO$_3$H, with an aromatic hydroxyl compound-acetone condensate (I), condensation products of an aromatic amine compound having the above general formula (3) with an aromatic hydroxyl compound-aldehyde condensate (II), condensation products of an aromatic amine compound having the above general formula (3) with a condensate (III) of an aromatic hydroxyl compound alone, condensation products of an aromatic amine compound having the above general formula (3) with an aromatic hydroxyl compound-aromatic amine compound condensate (IV), and condensation products of an aromatic amine compound having the above general formula (3) with a natural aromatic hydroxyl-containing organic compound (V); (B) a water-soluble polymeric compound; and (C) a colloidal silica and/or an alkali metal silicate.

2. The process of claim 1, wherein said aromatic hydroxyl compound as a component of said condensates (I) to (IV) has the following formula (4) or (5):

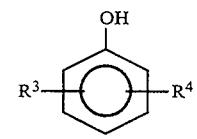

(4)

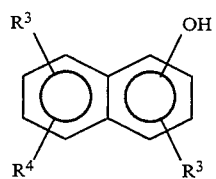

(5)

wherein $R^3$ is —H, —Cl, —OH, —COCH$_3$, —OCH$_3$, —COOH, —SO$_3$H or an alkyl group of 1 to 3 carbon atoms, and $R^4$ is —H, —Cl, —OH, —OCH$_3$, —OC$_2$H$_5$ or —COOH.

3. The process of claim 1, wherein said polymerization is conducted as suspension polymerization, emulsion polymerization, solution polymerization, bulk polymerization or gas phase polymerization.

4. The process of claim 1, wherein said monomer is selected from the group consisting of vinyl esters; vinyl halides; vinylidene halides; acrylic acid, methacrylic acid and their esters and salts; styrene; acrylonitrile; amethylstyrene; and vinyl ethers.

5. The process of claim 1, wherein said coating has been formed by applying a coating liquid comprising the components (A), (B) and (C) to the inner wall surfaces, followed by drying, wherein said coating liquid has a pH of 7.5 to 13.5.

6. The process of claim 5, wherein said coating liquid has a pH of 8.0 to 12.5.

7. The process of claim 5, wherein said coating liquid contains as a solvent water or a mixed solvent of water and an organic solvent compatible with water.

8. The process of claim 5, wherein said coating liquid contains the component (A) in a concentration of about 0.001 to about 15%, the component (B) in an amount of 0.01 to 10 parts by weight per part by weight of the component (A), and the component (C) in an amount of 5 to 3,000 parts by weight per 100 parts by weight of the component (B).

9. The process of claim 7, wherein said coating liquid contains a mixed solvent of water and an organic solvent compatible with water, the amount of said organic solvent in the mixed solvent being 50% by weight or less.

10. The process of claim 9, wherein the amount of said organic solvent in the mixed solvent is 30% by weight or less.

11. The process of claim 1, wherein all of the condensation products have been prepared by reacting said aromatic amine compound with the corresponding condensate (I), (II), (III), (IV) or (V) in the presence of a catalyst at a temperature of room temperature to about 200° C. for about 0.5 to 150 hours.

12. The process of claim 11, wherein about 0.5 to about 10 parts by weight of the condensate (I), (II), (III), (IV) or (V) is reacted with one part by weight of said aromatic amine compound.

* * * * *